UNITED STATES PATENT OFFICE.

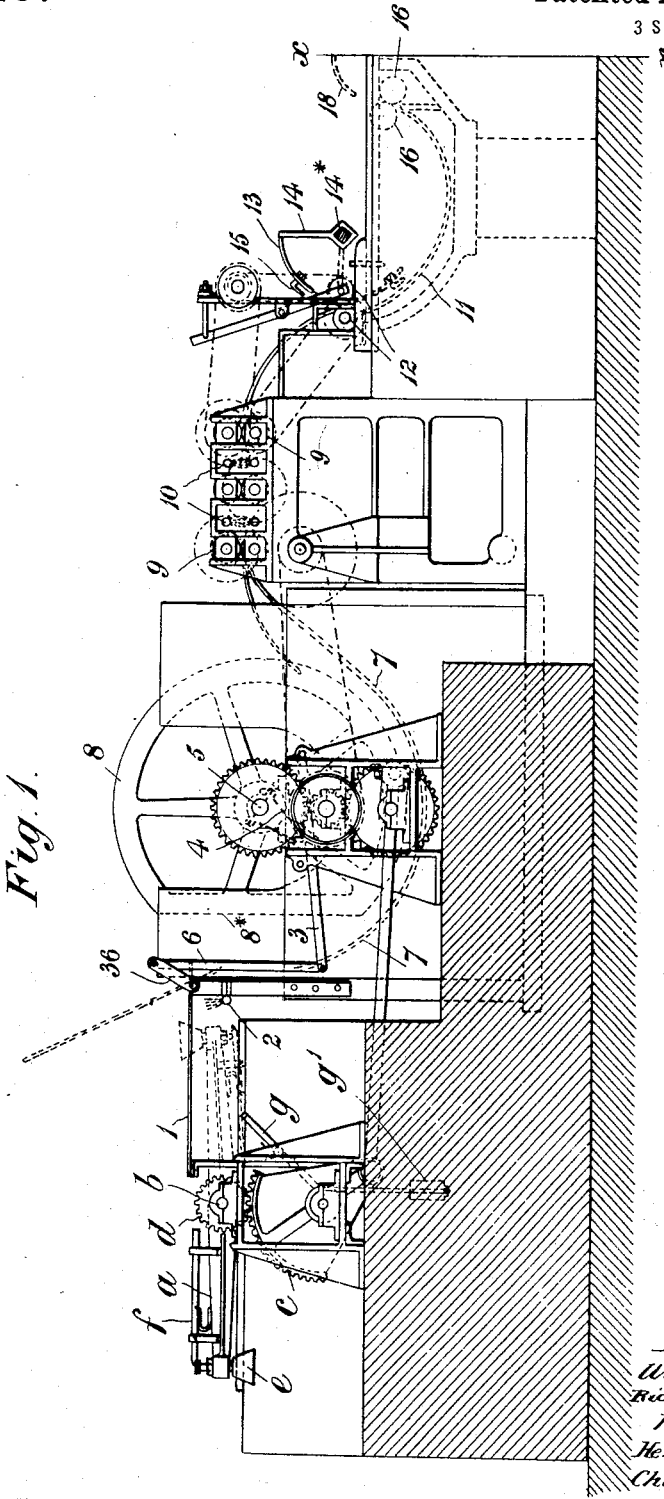

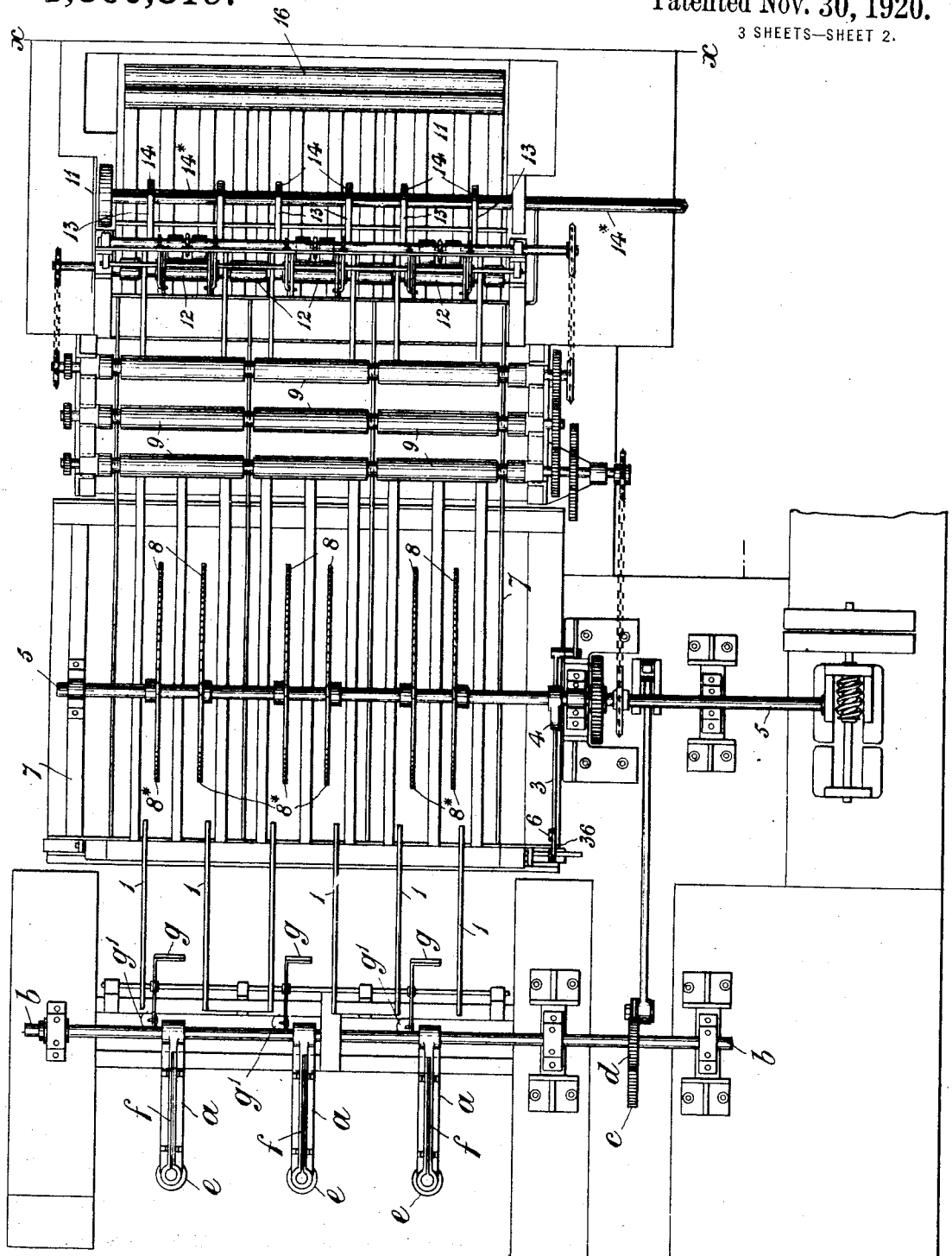

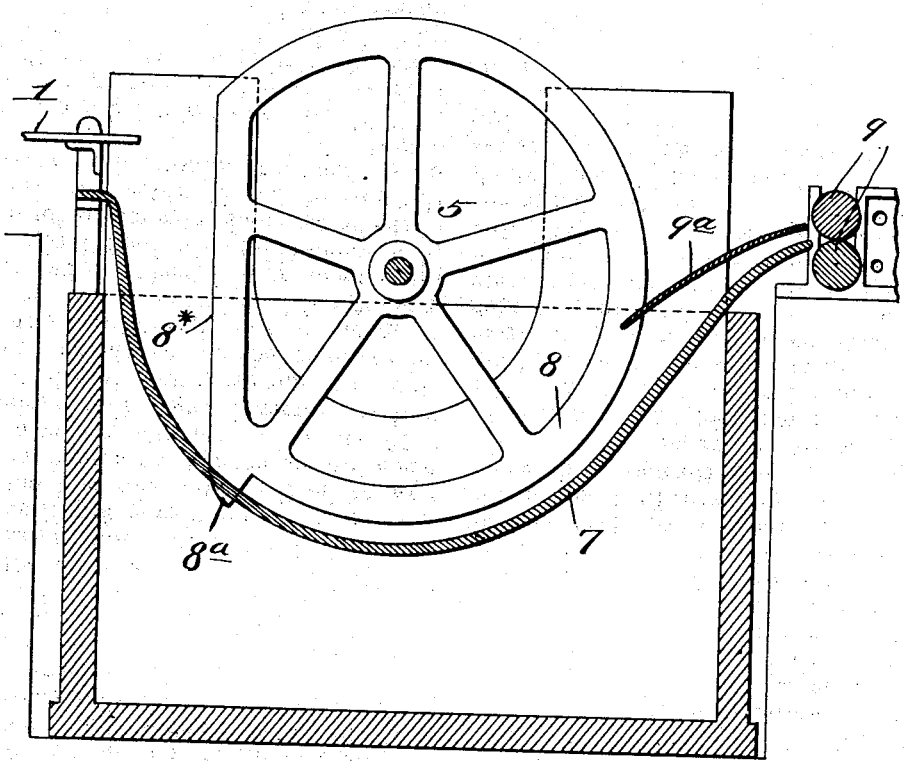

HUBERT SPENCE THOMAS, OF LLANDAFF, AND WILLIAM ROBERT DAVIES, OF WHITCHURCH, NEAR CARDIFF, WALES, AND RICHARD BEAUMONT THOMAS, DECEASED, LATE OF LONDON, ENGLAND, BY NORA CONSTANCE BEAUMONT THOMAS, OF ENGLEFIELD GREEN, ENGLAND, HENRY ROBERT WILLIAM ANDERSON, OF LONDON, ENGLAND, AND CHARLES BATHURST, OF LYDNEY, ENGLAND, EXECUTORS.

MANUFACTURE OF COATED PLATE AND APPARATUS THEREFOR.

1,360,819.      Specification of Letters Patent.      Patented Nov. 30, 1920.

Original application filed October 31, 1914, Serial No. 869,666. Divided and this application filed May 26, 1917. Serial No. 171,323.

*To all whom it may concern:*

Be it known that HUBERT SPENCE THOMAS, a subject of the King of Great Britain, residing at Llandaff, county of Glamorgan, Wales, and WILLIAM ROBERT DAVIES, a subject of the King of Great Britain, residing at Whitchurch, near Cardiff, county of Glamorgan, Wales, and RICHARD BEAUMONT THOMAS, deceased, formerly a subject of the King of Great Britain, and lately residing at London, S. W., England, (NORA CONSTANCE BEAUMONT THOMAS, widow, HENRY ROBERT WILLIAM ANDERSON, clerk in holy orders, chaplain to His Majesty's forces, and Sir CHARLES BATHURST, K. B. E., captain in His Majesty's army, barrister at law, and member of Parliament, subjects of the King of Great Britain, residing, respectively, at The Glade, Englefield Green, in the county of Surrey, England, 80 Redcliffe Gardens, London, England, and Lydney Park, Lydney, in the county of Gloucester, England, executors of RICHARD BEAUMONT THOMAS,) have invented certain new and useful Improvements in the Manufacture of Coated Plates and Apparatus Therefor to be Employed in the said Manufacture, of which the following is a specification.

The said invention relates to the manufacture of tin and terne plates and other like metal coated plates or sheets consisting in immersing the plates or sheets separately in pickle so as to effect the chemical cleaning of the same, the said plates or sheets being subsequently swilled, preparatory to their being tinned, branned and dusted, and the said invention consists of the new or improved apparatus hereinafter described whereby the plates or sheets to be tinned are automatically taken one by one from a pile or piles of plates or sheets arranged at the front end of the machine and are passed first into the pickling bath and then by pairs of rolls to the tin-pot being brought under the action of a water swilling appliance arranged between the exit end of the pickling bath and the entrance end of the tin-pot both sides of each sheet or plate being thereby washed free from pickling acid, the whole of the operations being carried out continuously and automatically, that is to say, without the intervention of hand labor.

We will describe the said invention in connection with the accompanying drawings in which—

Figure 1 represents in side elevation an apparatus constructed in accordance with the present invention, Fig. 2 shows the same in top plan, and Fig. 3 represents a vertical section through the pickling bath.

The same letters and figures of reference indicate the same or corresponding parts in both figures of the drawings.

At the front end of the machine is an automatic or mechanical feeder for taking the plates or sheets to be tinned singly or one by one from a pile or series of piles of plates or sheets placed on supports at the said front end of the machine.

The automatic or mechanical feeder consists of an arm or lever $a$ or a series of levers $a$ fixed to a rocking shaft $b$ which receives a forward and backward partial rotation through the gearing of the toothed quadrant $c$ with the pinion $d$ on the said shaft $b$. The arm or lever $a$, or each arm or lever $a$ where more than one are employed, carries at its free end a suction cup $e$ of india rubber or the like having therein a spring pressed valve which is opened against the action of its spring by a lever $f$ on the back of the arm $a$ when the said lever $f$ is by the forward motion of the arm $a$ brought against a stop lever $g$ the motion of which is retarded by the weight $g^1$. When by the backward motion of the arms $a$ the suction cup $e$ is brought against and is pressed on to the uppermost plate or sheet in the pile the edge of the cup is spread out and consequently on the reverse motion of the arm *a* suction is produced in the cup *e* and the uppermost plate or sheet in the pile is lifted or taken up and carried over on to tilting bars or a tilting platform 1, the suction of the cup being released as soon as or immediately before the plate or sheet reaches the tilting bars or platform 1 by the opening of the spring pressed valve of the cup *e*. The cup *e* is wetted before the arm *b* commences its backward motion so as to insure a perfect suction when brought into contact with the next uppermost plate. The wetting of the suction cup *e* may be effected by jets of water issuing from holes in a water delivery pipe 2 the holes being in such positions in the pipe 2 that the water is received in the cups *e* when they are below the level of the said pipe.

The tilting platform 1 is turned into the nearly vertical position indicated in dotted lines in Fig. 1 when a plate or sheet is delivered thereon by the operation of a lever 3 actuated by a wiper cam or the like 4 on the shaft 5 the lever 3 acting through the connecting rod 6 and link 36 on the spindle of the tilting platform 1.

The plates or sheets are delivered by the tilting platform 1 to the trough shaped or curved guides 7 of a pickling bath, in which bath wheels or disks 8 rotate, the wheels or disks being fixed on the shaft 5, and having a flat or cut away part 8* at one side to permit the plates or sheets to enter the bath. The wheels or disks also carry projections 8ª which extend through or between the curved guides 7 to engage the back edges of the plates and thus operate to push the plates or sheets through the bath and over the curved guides 7 until their front edges are seized by the first pair of rolls 9, 9. A deflector 9ª is arranged to engage the front edge of each advancing sheet and thus direct the sheet between the rolls 9. The swilling of the plates or sheets free of pickling acid is effected by a row or series of water jets issuing from water delivery pipes 10, 10 situated adjacent the rolls 9, 9, and above and below the line along which the plates or sheets are carried by the rolls 9, 9 to the tin-pot 11. At the entrance end on the tin-pot 11 is a pair of rolls 12, 12 rotating at such a speed that the plates or sheets are carried by them more quickly through the flux on the surface of the molten tin at the entrance end of the tin-pot 11 than through any other part of the apparatus. The plates or sheets after they have passed through the rolls 12, 12 are carried through the tin-pot 11 by curved extensions 13 of radial arms 14 on the shaft 14* the curved extensions 13 terminating in fingers 15 which engage with the rear edge of the plate or sheet until it is seized by the pair of rolls 16, 16 by which it is transferred to mechanisms which perform subsequent operations on the plates.

From an examination of the plan Fig. 2, it will be seen that the machine is made of a width proper to take three sheets abreast or side by side, the three suckers *e, e, e* at the front end of the machine simultaneously picking up three single plates or sheets from three separate piles arranged at the front end of the machine. From this arrangement the output of the machine is largely increased.

By the machinery or apparatus hereinbefore described and illustrated in the accompanying drawings the plates or sheets to be tinned can be taken one by one from a pile, or series of piles at the front end of the machine and can be carried through the whole series of operations without the intervention of hand labor.

We claim—

1. In a machine for handling flat plates or sheets, the combination of a receptacle having a curved bottom for the travel thereover of the plates or sheets, and rotary members having peripheries concentric with the curved bottom of the receptacle and flat portions in their peripheries and adjacently located projections extending outwardly from the concentric portions of their peripheries to coöperate with the upper sides and back edges of the sheets to advance the latter around the curved bottom of the receptacle.

2. In a machine for handling flat plates or sheets, the combination of a receptacle having a curved bottom for the travel thereover of the sheets or plates, rotatable members having peripheries adjacent to and concentric with the curved bottom of the receptacle and having flat or cut away peripheral portions to coöperate with a side of the sheet, and means for feeding a plate or sheet to the receptacle while the flat peripheral portions of said members are presented to the entrance end of the receptacle, continued rotation of said members causing the plate or sheet to be advanced through the receptacle.

3. In a machine for handling flat plates or sheets, a swilling appliance comprising pairs of feed rolls adapted to advance the plates or sheets between them, and water delivery pipes located between adjacent pairs of feed rolls and at opposite sides of the path of the plates or sheets, said water delivery pipes having perforations operative to spray and thus wash both sides of the plates or sheets as the latter are fed by the pairs of feed rolls.

4. In a machine for handling flat metallic plates or sheets, the combination of a receptacle having a curved bottom, means for mechanically feeding the plates or sheets successively to said receptacle, and a pusher rotatable in a path above the curved bottom of the receptacle, and having a flat portion to receive the plates from the feeding means and to engage the upper flat surface of the plates or sheets and thus submerge the same while advancing over said curved bottom.

In testimony whereof we have hereunto set our hands.

HUBERT SPENCE THOMAS.
WILLIAM ROBERT DAVIES.

NORA CONSTANCE BEAUMONT THOMAS,
HENRY ROBERT WILLIAM ANDERSON,
CHARLES BATHURST,
*Executors of Richard Beaumont Thomas, deceased.*